United States Patent
Liu

(10) Patent No.: US 9,438,904 B2
(45) Date of Patent: Sep. 6, 2016

(54) REDUCED LOOK-UP TABLE FOR LM MODE CALCULATION

(71) Applicant: Futurewei Technologies, Inc., Plano, TX (US)

(72) Inventor: Lingzhi Liu, San Jose, CA (US)

(73) Assignee: Futurewei Technologies, Inc., Plano, TX (US)

(*) Notice: Subject to any disclaimer, the term of this patent is extended or adjusted under 35 U.S.C. 154(b) by 824 days.

(21) Appl. No.: 13/732,249

(22) Filed: Dec. 31, 2012

(65) Prior Publication Data
US 2013/0188696 A1 Jul. 25, 2013

Related U.S. Application Data

(60) Provisional application No. 61/588,399, filed on Jan. 19, 2012.

(51) Int. Cl.
*H04N 7/26* (2006.01)
*H04N 19/50* (2014.01)
*H04N 19/593* (2014.01)
*H04N 19/186* (2014.01)

(52) U.S. Cl.
CPC ...... *H04N 19/00569* (2013.01); *H04N 19/593* (2014.11); *H04N 19/186* (2014.11)

(58) Field of Classification Search
CPC .............................................. H04N 19/00569
USPC ................................................... 375/240.12
IPC ........................................................ H04N 7/26
See application file for complete search history.

(56) References Cited

U.S. PATENT DOCUMENTS

2011/0255591 A1* 10/2011 Kim ................... H04N 19/107
 375/240.02
2014/0023139 A1* 1/2014 Xu .................. H04N 19/00781
 375/240.12

FOREIGN PATENT DOCUMENTS

EP 2387242 A2 11/2011

OTHER PUBLICATIONS

Bross, B., et al, "WD5: Working Draft 5 of High-Efficiency Video Coding," Joint Collaborative Team on Video Coding (JCT-VC) of ITU-T SG16 WP3 and ISO/IEC JTC1/SC29/WG11, 7th Meeting: Geneva, CH, JCTVC-G1103_d6, Nov. 21-30, 2011, 232 pages.
Liu, L., et al, "Non-CE6a: Reduce the look-up table entries for LM mode calculation," Joint Collaborative Team on Video Coding (JCT-VC) of ITU-T SG16 WP3 and ISO/IEC JTC1/SC29/WG11, 8th Meeting: San Jose, CA, JCTVC-H0490, Feb. 1-10, 2012, 4 pages.

(Continued)

*Primary Examiner* — Yulin Sun
(74) *Attorney, Agent, or Firm* — Conley Rose, P.C; Grant Rodolph; Adam J. Stegge

(57) ABSTRACT

A video codec comprising a processor configured to generate a prediction block for a chroma block, wherein the prediction block comprises a plurality of predicted chroma samples, wherein each of the plurality of predicted chroma samples is based on a first plurality of reconstructed luma samples located in a corresponding reconstructed luma block, a second plurality of reconstructed luma samples located in neighboring blocks of the corresponding reconstructed luma block, and a look-up table, wherein an index of the look-up table is based on the second plurality of reconstructed luma samples, wherein an index of the look-up table has less than 63 values.

33 Claims, 4 Drawing Sheets

(56) References Cited

OTHER PUBLICATIONS

Foreign Communication From a Counterpart Application, PCT Application PCT/US2013/022159, International Search Report dated May 7, 2013, 7 pages.
Foreign Communication From a Counterpart Application, PCT Application PCT/US2013/022159, Written Opinion dated May 7, 2013, 11 pages.
Lee, S., et al., "Intra Prediction Method Based on the Linear relationship Between the Channels for YUV 4:2:0 Intra Coding," IEEE International Conference on Image Processing, 2009, 4 pages.
Chen, J., et al., "CE6.a.4: Chroma Intra Prediction by Reconstructed Luma Samples," JCTVC-E266, 5th Meeting JCT-VC of ITU-T SG16 WP3 and ISO/IEC JTC1/SC29/WG11, Geneva Switzerland, Mar. 16-23, 2011, 10 pages.
Bossen, F., "Common Test Conditions and Software Reference Configurations," JCTVC-G1200, 7th Meeting JCT-VC of ITU-T SG16 WP3 and ISO/IEC JTC1/SC29/WG11, Geneva, Switzerland, Nov. 21-30, 2011, 4 pages.
Bross, B., et al., "WD5: Working draft 5 of High Efficiency Video Coding," JCTVC-G1103 d4, 7th Meeting JCT-VC of ITU-T SG16 WP3 and ISO/IEC JTC1/SC29/WG11, Geneva, Switzerland, Nov. 21-30, 2011, 219 pages.

\* cited by examiner

REDUCED LOOK-UP TABLE FOR LM MODE CALCULATION

CROSS-REFERENCE TO RELATED APPLICATIONS

The present application claims priority to U.S. Provisional Patent Application No. 61/588,399 filed Jan. 19, 2012 by Lingzhi Liu and entitled "Reduced Look-Up Table for LM Mode Calculation", which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

The amount of video data needed to depict even a relatively short film can be substantial, which may result in difficulties when the data is to be streamed or otherwise communicated across a communications network with limited bandwidth capacity. Thus, video data is generally compressed before being communicated across modern day telecommunication networks. Video compression devices often use software and/or hardware at the source to encode the video data prior to transmission, thereby decreasing the quantity of data needed to represent video frames or images. The compressed data is then received at the destination by a video decompression device that decodes the video frames. Due to limited network resources, it is desirable to develop compression and decompression techniques that increase compression ratios and/or reduce implementation complexity without substantially sacrificing video quality.

SUMMARY

In one embodiment, the disclosure includes a video codec comprising a processor configured to generate a prediction block for a chroma block, wherein the prediction block comprises a plurality of predicted chroma samples, wherein each of the plurality of predicted chroma samples is based on a first plurality of reconstructed luma samples located in a corresponding reconstructed luma block, a second plurality of reconstructed luma samples located in neighboring blocks of the corresponding reconstructed luma block, and a look-up table, wherein an index of the look-up table is based on the second plurality of reconstructed luma samples, wherein an index of the look-up table has less than 63 values.

In another embodiment, the disclosure includes a method used in video coding comprising generating a prediction block for a chroma block, wherein the prediction block comprises a plurality of predicted chroma samples, wherein each of the plurality of predicted chroma samples is based on a first plurality of reconstructed luma samples located in a corresponding reconstructed luma block, a second plurality of reconstructed luma samples located in neighboring blocks of the corresponding reconstructed luma block, and a look-up table, wherein an index of the look-up table is based on the second plurality of reconstructed luma samples, wherein an index of the look-up table has less than 63 values.

In yet another embodiment, the disclosure includes a video codec comprising a processor configured to generate a prediction block for a chroma block, wherein the prediction block comprises a plurality of predicted chroma samples, wherein each of the plurality of predicted chroma samples is based on a first plurality of reconstructed luma samples located in a corresponding reconstructed luma block, a second plurality of reconstructed luma samples located in neighboring blocks of the corresponding reconstructed luma block, and a plurality of reconstructed chroma samples located in neighboring blocks of the chroma block, wherein generating the plurality of predicted chroma samples includes computing a first intermediate variable, denoted as a2s, based on the second plurality of reconstructed luma samples, deriving a second intermediate variable, denoted as a3, from the first intermediate variable, wherein the second intermediate variable is set to 0 if the first intermediate variable is less than 8.

In yet another embodiment, the disclosure includes a video codec comprising a processor configured to generate a prediction block for a chroma block, wherein the prediction block comprises a predicted chroma sample, wherein the predicted chroma sample is based on a first reconstructed luma sample located in a corresponding reconstructed luma block, a second reconstructed luma sample located in a neighboring block of the corresponding reconstructed luma block, and an equation related to an input index and an intermediate variable, wherein the input index is based on the second reconstructed luma sample, and wherein the number of the input index is less than 63.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
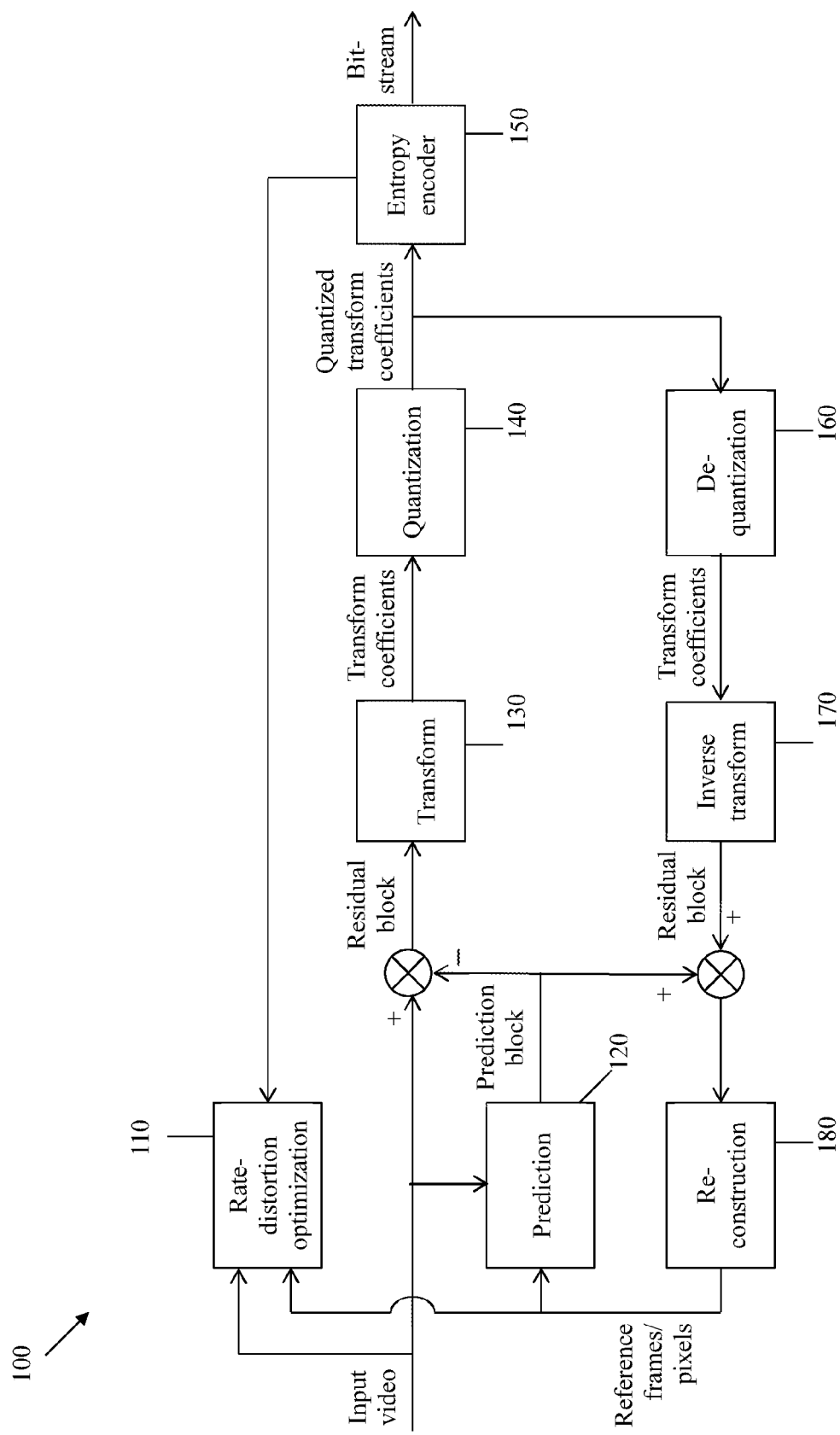
FIG. 1 is a schematic diagram of an embodiment of a video encoder.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Typically, video media involves displaying a sequence of still images or frames in relatively quick succession, thereby causing a viewer to perceive motion. Each frame may comprise a plurality of picture elements or pixels, each of which may represent a single reference point in the frame. During digital processing, each pixel may be assigned an integer value (e.g., 0, 1, . . . , 255) that represents an image quality or color at the corresponding reference point. The color space may be represented by three components including a luminance (luma or Y) component and two chrominance (chroma) components, denoted as Cb and Cr (or sometimes as U and V). A luma or chroma integer value is typically stored and processed in binary form using bits. The number of bits used to indicate a luma or chroma value may be referred to as a bit depth or color depth.

In use, an image or video frame may comprise a large amount of pixels (e.g., 2,073,600 pixels in a 1920×1080 frame), thus it may be cumbersome and inefficient to encode and decode (generally referred to hereinafter as code) each pixel independently. To improve coding efficiency, a video frame is usually broken into a plurality of rectangular blocks or macroblocks, which may serve as basic units of processing such as coding, prediction, transform, and quantization. For example, a typical N×N block may comprise $N^2$ pixels, where N is an integer greater than one and is often a multiple of four. In the YUV or YCbCr color space, each luma (Y) block corresponds to two chroma blocks including a Cb block and a Cr block. The Cb block and Cr block also correspond to each other. The chroma blocks and their corresponding luma block are may be located in a same relative position of a video frame, slice, or region.

In video coding, various sampling rates may be used to code the YCbCr components. The size of a Cb block, its corresponding Cr block, and/or its corresponding Y block may be the same or different depending on a sampling rate. For example, in a 4:2:0 sampling rate, each N×N chroma (Cb or Cr) block may correspond to a 2N×2N luma block. In this case, a width or height of the chroma block is half that of the corresponding luma block. The chroma components are downsampled or subsampled, since human eyes may be less sensitive to chroma components than to the luma component. For another example, in a 4:4:4 sampling rate, each N×N chroma (Cb or Cr) block may correspond to a N×N luma block. In this case, higher video fidelity may be preserved, but more data may need to be coded. Other sampling rates, such as 4:2:2, 4:2:1, etc., may also be used.

A block in a video frame may be spatially correlated with other blocks within the same frame such that pixel values across some blocks may vary only slightly and/or exhibit repetitious textures. Modern methods of video-compression exploit these spatial correlations using various techniques which may be known collectively as intra-frame prediction (or in short as intra prediction). When coding a current block using intra prediction, a prediction block or prediction unit is generated based on one or more previously coded reference blocks. The prediction block may be an estimated version of the current block. A residual block may be generated by subtracting the current block from the prediction block, or vice versa, which represents prediction residuals or errors. Since an amount of data needed to represent the prediction residuals may typically be less than an amount of data needed to represent the original block, the residual block may be coded instead of the current block to achieve a higher compression ratio.

Intra prediction may be implemented by a video encoder or decoder (generally referred to herein as a codec). In the encoder, a residual block generated by intra prediction may be transformed, quantized, and scanned before being included into an encoded data stream. Upon reception of the encoded data stream, a decoder may add a reconstructed residual block to an independently generated prediction block to recreate the current block. Although the recreated current block may be an imperfect version of the original current block, e.g., due to quantization, their differences may be hardly perceptible to the human eye. Thus, substantial bit savings may be derived without significantly degrading the quality of the reconstructed image.

In a video region where neighboring blocks are identical or near-identical, use of intra prediction may result in a residual block comprising many zero and/or near-zero pixel values. Furthermore, transformation, quantization, and/or scanning of the residual block may remove many of the zero and/or near-zero coefficients from the encoded data stream, thereby resulting in further compression of video data. Thus, more accurate prediction of the original image may result in higher coding efficiencies. To improve accuracy of intra prediction, video/image coding standards may utilize a plurality of intra prediction modes. For example, up to six intra prediction modes may be used for the chroma components (including Cr and Cb) in high efficiency video coding (HEVC), which is poised to be the next video standard issued by the Joint Collaborative Team on Video Coding (JCT-VC) of the International Telecommunications Union (ITU) Telecommunications Standardization Sector (ITU-T) and International Organization for Standardization (ISO)/ International Electrotechnical Commission (IEC) Moving Picture Experts Group (MPEG).

For the chroma components, six intra prediction modes may include a chroma from luma prediction mode (referred to as a linear model or method (LM) mode), a vertical prediction mode, a horizontal prediction mode, a diagonal mode, a direct current (DC) prediction mode, and a direct mode (DM) derived from the luma component. Various algorithms may be used to determine an optimal intra prediction mode for a chroma block. For example, an encoder may test an intra predicting chroma block using some or all of the available modes, and then calculate a sum of absolute error (SAE) for each prediction mode. The prediction mode leading to the smallest SAE may be selected as the optimal mode. It should be noted that in a final HEVC standard to be issued, the intra prediction modes used for the chroma components may be different from the six aforementioned modes. The present disclosure mainly relates to the LM mode.

According to a HEVC work draft entitled "WD5: Working Draft 5 of High-Efficiency Video Coding" with document number: JCTVC-G1103_d9, which is hereby incorporated by reference, a current design of LM mode utilizes reconstructed luma samples or pixels to generate chroma samples. Specifically, when a LM mode is to be implemented to generate a prediction block for a current chroma (Cb or Cr) block, the LM mode includes obtaining a linear combination of previously reconstructed luma samples that have been interpolated from within a corresponding luma block of the current chroma block. The LM mode further includes obtaining a linear combination of previously reconstructed luma samples from luma blocks which neighbor the corresponding luma block. In addition, the LM mode further includes obtaining previously reconstructed chroma samples from chroma blocks which neighbor the current chroma block.

According to JCTVC-G1103_d9, sample values of the chroma prediction block may be derived using algorithms and/or equations (1) to (19) described in paragraphs below. Before getting to the equations, definitions of variables used in equations herein are given first.

For a reconstructed luma block with 2nS (nS is a positive integer) luma samples on each of its four sides, [x, y]

denotes a position or index of a luma sample in the reconstructed luma block, wherein both integers x and y range from 0 to 2nS−1. Further, recSamples$_L$[x, y] denotes a luma sample at position [x, y]. In HEVC working drafts (e.g., Document JCTVC-G1103_d9), recSamples$_L$[x, y] may sometimes also be denoted as P$_{LM}$[x, y]. In equations herein, notation: m=n . . . k is used to suggest a range of values, wherein m starts from n (including n) and ends with k (including k), and wherein m, n, and k are all integers. For instance, x and y ranging from 0 to 2nS−1 is denoted as "x, y=0 . . . 2nS−1".

As mentioned above, reconstructed luma samples in the left and top neighboring luma blocks may also be used in the LM mode to predict the current chroma block. [x, −1] denotes a position or index of a luma sample in a column left to and adjacent the corresponding luma block (referred to hereafter as the left neighboring column), and [−1, y] denotes a position of a luma sample in the row above and adjacent the corresponding luma block (referred to hereafter as the top neighboring row), wherein both x and y range from 0 to 2nS−1. Further, recSamples$_L$[x, −1] denotes a luma sample at position [x, −1], and recSamples$_L$[−1, y] denotes a luma sample at position [−1, y].

In 4:2:0 sampling, the reconstructed 2nS×2nS corresponding luma block may be first filtered to an nS×nS luma block, which is then used as a reference block for intra prediction of the current chroma block. For the filtered luma block with nS luma samples on each of its four sides, p$_Y$'[x, y] denotes a filtered luma sample at position [x, y] wherein both x and y range from 0 to nS−1. Similarly, the left neighboring column and the top neighboring row comprising luma samples may also be first filtered before used reference samples in the LM mode. After filtering, p$_Y$'[x, −1] denotes a filtered luma sample at position [x, −1], and p$_Y$'[−1, y] denotes a value of a filtered luma sample at position [−1, y], wherein both x and y range from 0 to nS−1.

As mentioned above, previously coded chroma samples in the left and top neighboring chroma blocks may also be used in the LM mode. In the neighboring chroma blocks, [x, −1] denotes an index of a chroma sample in a column left to and adjacent the current chroma block (also referred to as the left neighboring column), and [−1, y] denotes an index of a chroma sample in the row above and adjacent the current chroma block (also referred to as the top neighboring row), wherein both x and y range from 0 to nS−1. Further, p[x, −1] denotes a chroma sample at position [x, −1], and p[−1, y] denotes a chroma sample at position [−1, y], wherein both x and y range from 0 to nS−1.

For the chroma prediction block to be computed, predSamples[x, y] denotes a prediction or predicted chroma sample at position [x, y], wherein x and y range from 0 to nS−1. BitDepthC denotes a number of bits (i.e., bit depth) used for the chroma component (Cr or Cb). For example, in HEVC, BitDepthC may equal 8 or 10 (or any other suitable value). If BitDepthC=8, chroma samples such as p[x, y] and predSamples[x, y] may have a maximum of 8 bits. In use, the luma component may typically have a same bit depth as the chroma component, thus filtered luma samples such as p$_Y$'[x, y] have a same maximum number of bits as p[x, y].

In the LM mode, to generate predicted chroma samples, the reconstructed luma samples are filtered first. Equation (1) applies a 3-tap filter with [1 2 1] coefficients to 2nS reconstructed luma samples located in the left neighboring column and produces nS filtered luma samples. Equation (2) applies a 2-tap averaging filter to 2nS reconstructed luma samples in the top neighboring row and produces nS filtered luma samples. Equation (3) applies a 2-tap averaging filter to 2nS×2nS reconstructed luma samples in the corresponding luma block and produces nS×nS filtered luma samples.

$$p_Y'[x,-1]=(\text{recSamples}_L[2x-1,-1]+2*\text{recSamplesd}_L[2x,-1]+\text{recSamples}_L[2x+1,-1]+2)>>2, \text{ with } x=0 \ldots nS-1 \quad (1)$$

$$p_Y'[-1,y]=(\text{recSamples}_L[-1,2y]+\text{recSamples}_L[-1,2y+1])>>1, \text{ with } y=0 \ldots nS-1 \quad (2)$$

$$p_Y'[-1,y]=(\text{recSamples}_L[2x,2y]+\text{recSamples}_L[2x,2y+1])>>1, \text{ with } x,y=0 \ldots nS-1 \quad (3)$$

Next, predicted chroma samples (i.e., predSamples[x, y], with x, y=9 . . . nS−1) can be computed via intermediate variables, denoted alpha (α) and beta (β), using equations:

$$\text{alpha} = \frac{\left[2*nS*\left(\sum_{y=0}^{nS-1} p_Y'[-1,y]*p[-1,y] + \sum_{y=0}^{nS-1} p_Y'[x,-1]*p[x,-1]\right) - \left(\sum_{y=0}^{nS-1} p_Y'[-1,y] + \sum_{x=0}^{nS-1} p_Y'[x,-1]\right)\left(\sum_{y=0}^{nS-1} p[-1,y] + \sum_{x=0}^{nS-1} p[x,-1]\right)\right]}{\left[2*nS*\left(\sum_{y=0}^{nS-1} p_Y'[-1,y]^2 + \sum_{x=0}^{nS-1} p_Y'[x,-1]^2\right) - \left(\sum_{y=0}^{nS-1} p_Y'[-1,y] + \sum_{x=0}^{nS-1} p_Y'[x,-1]\right)^2\right]} \quad (4)$$

$$\text{beta} = \frac{\left(\sum_{y=0}^{nS-1} p[-1,y] + \sum_{x=0}^{nS-1} p[x,-1]\right) - \text{alpha}*\left(\sum_{y=0}^{nS-1} p_Y'[-1,y] + \sum_{y=0}^{nS-1} p_Y'[x,-1]\right)}{2*nS} \quad (5)$$

$$\text{predSamples}[x,y] = \text{alpha}*p_Y'[x,y] + \text{beta}, \text{ with } x, y = 0 \ldots nS-1 \quad (6)$$

From equations (4) to (6), note that the final value of a prediction chroma sample depends on both the luma and chroma components which have already been coded. In the luma component, filtered luma samples in the left neighboring column, top neighboring row, and corresponding luma block are taken into account. In the chroma component, reconstructed chroma samples in the left neighboring column and top neighboring row are taken into account.

The computation of alpha in equation (4) and beta in equation (5) may be overly complex to implement, thus in practice after obtaining filtered luma samples (i.e., p$_Y$'[x, y]) using equations (1) to (3), more intermediate variables are introduced to derive predicted chroma samples (i.e., predSamples[x, y]). Further, instead of divisional operations, integer and/or bit-wise operations are used. For example, intermediate variables, denoted as k3, L, C, LL, LC, and k2, are derived as follows:

$$k3 = \text{Max}(0, BitDepth_C + \log_2(nS) - 14) \quad (7)$$

$$L = \left(\sum_{y=0}^{nS-1} p_Y'[-1,y] + \sum_{x=0}^{nS-1} p_Y'[x,-1]\right) >> k3 \quad (8)$$

$$C = \left(\sum_{y=0}^{nS-1} p[-1, y] + \sum_{x=0}^{nS-1} p[x, -1]\right) >> k3 \quad (9)$$

$$LL = \left(\sum_{y=0}^{nS-1} p'_Y[-1, y]^2 + \sum_{x=0}^{nS-1} p'_Y[x, -1]^2\right) >> k3 \quad (10)$$

$$LC = \left(\sum_{y=0}^{nS-1} p'_Y[-1, y] * p[-1, y] + \sum_{y=0}^{nS-1} p'_Y[x, -1] * p[x, -1]\right) >> k3 \quad (11)$$

$$k2 = \log_2((2*nS) >> k3) \quad (12)$$

Next, more intermediate variables, denoted as a1, a2, k1, a1s, a2s, a3, a, k, and b, are derived using the following pseudo code:

$$a1=(LC<<k2)-L*C \quad (13)$$

$$a2=(LL<<k2)-L*L \quad (14)$$

$$k1=\text{Max}(0, \log_2(abs(a2))-5)-\text{Max}(0, \log_2(abs(a1))-14)+2 \quad (15)$$

$$a1s=a1>>\text{Max}(0, \log_2(abs(a1))-14) \quad (16)$$

$$a2s=abs(a2>>\text{Max}(0, \log_2(abs(a2))-5)) \quad (17)$$

$$a3=a2s<1?0:\text{Clip3}(-2^{15},2^{15}-1,a1s*\text{lmDiv}[a2s]+(1<<(k1-1))>>k1) \quad (18)$$

$$a=a3>>\text{Max}(0, \log_2(abs(a3))-6) \quad (19)$$

$$k=13-\text{Max}(0, \log_2(abs(\text{alpha}))-6) \quad (20)$$

$$b=(C-((a*L)>>k)+(1<<(k2-1))>>k2 \quad (21)$$

Variable a in equation (19) may be a representation of alpha, and variable b in equation (21) may be a representation of beta. After obtaining a, b, and k, predicted chroma samples are computed using equation:

$$\text{predSamples}[x,y]=\text{Clip1}_C(((p_Y'[x,y]*a)>>k)+b), \text{ with } x,y=0 \ldots nS-1 \quad (22)$$

where function $\text{Clip1}_C(x)$ is defined as:

$$\text{Clip1}_C(x)=\text{Clip3}(0,(1<<\text{BitDepth}_C)-1,x)$$

and where function Clip3(x, y, z) is defined as:

$$\text{Clip3}(x, y, z) = \begin{cases} x; & z < x \\ y; & z > y \\ z; & \text{otherwise} \end{cases}$$

In the above pseudo code, after a2s is calculated from equation (17), it is used as an index or key of a look-up table to get a value of lmDiv, which is then used in equation (18). Table 1 shows a specification of an lmDiv look-up table, which is listed as Table 8-9 in the work draft JCTVC-G1103_d9. Although 64 a2s entries are listed in Table 1, in practice only 63 a2s entries with values from 1-63 may be used in the computation of LM mode.

TABLE 1

Specification of lmDiv look-up table in JCTVC-G1103_d9.

| a2s | 1 | 2 | 3 | 4 | 5 | 6 | 7 | 8 | 9 |
|---|---|---|---|---|---|---|---|---|---|
| lmDiv | 32768 | 16384 | 10923 | 8192 | 6554 | 5461 | 4681 | 4096 | 3641 |
| a2s | 10 | 11 | 12 | 13 | 14 | 15 | 16 | 17 | 18 |
| lmDiv | 3277 | 2979 | 2731 | 2521 | 2341 | 2185 | 2048 | 1928 | 1820 |
| a2s | 19 | 20 | 21 | 22 | 23 | 24 | 25 | 26 | 27 |
| lmDiv | 1725 | 1638 | 1560 | 1489 | 1425 | 1365 | 1311 | 1260 | 1214 |
| a2s | 28 | 29 | 30 | 31 | 32 | 33 | 34 | 35 | 36 |
| lmDiv | 1170 | 1130 | 1092 | 1057 | 1024 | 993 | 964 | 936 | 910 |
| a2s | 37 | 38 | 39 | 40 | 41 | 42 | 43 | 44 | 45 |
| lmDiv | 886 | 862 | 840 | 819 | 799 | 780 | 762 | 745 | 728 |
| a2s | 46 | 47 | 48 | 49 | 50 | 51 | 52 | 53 | 54 |
| lmDiv | 712 | 697 | 683 | 669 | 655 | 643 | 630 | 618 | 607 |
| a2s | 55 | 56 | 57 | 58 | 59 | 60 | 61 | 62 | 63 |
| lmDiv | 596 | 585 | 575 | 565 | 555 | 546 | 537 | 529 | 520 |
| a2s | 64 | | | | | | | | |
| lmDiv | 512 | | | | | | | | |

Since lmDiv is a function of variable a2s, each entry of lmDiv in Table 1 can be calculated using following pseudo code, wherein i=a2s:

UInt lmDiv [63];
for(Int i=1; i<64; i++)

$$\text{lmDiv}[i]=((1<<15)+i/2)/i \quad (23)$$

Although Table 1 can be used to generate prediction chroma samples, as currently constructed, the look-up table includes 63 a2s or lmDiv values, which is a relatively large number. If equation (23) is used for calculation instead of the look-up table, the iterative loop contains 63 computations.

Disclosed herein are systems and methods for improving intra prediction in the LM mode. A disclosed LM mode may be implemented in a video codec. In the disclosed LM mode, the intermediate variable lmDiv may be determined by using an lmDiv look-up table comprising less than 63 lmDiv values or valid entries. In an embodiment, the look-up table comprises only 56 or 32 valid lmDiv entries. Compared to prior art, the reduction of entries may lead to saving of storage space in the codec. Alternatively, instead of using a look-up table, lmDiv may be computed from another intermediate variable a2s, and lmDiv may be used to compute yet another intermediate variable a3. In an embodiment, a3 is deemed to equal 0 when a2s is less than 8. In this case, lmDiv does not need to be computed, which simplifies computation of the LM mode. In another embodiment, a3 is deemed to equal 0 when a2s is less than 32, which further simplifies computation of the LM mode. By using disclosed lmDiv look-up tables or simplified equations, the disclosed LM mode may improve coding performance in, e.g., HEVC.

FIG. 1 illustrates an embodiment of a video encoder 100, in which a disclosed LM mode may be used. The video encoder 100 may comprise a rate-distortion optimization (RDO) module 110, a prediction module 120, a transform module 130, a quantization module 140, an entropy encoder 150, a de-quantization module 160, an inverse transform module 170, and a reconstruction module 180 arranged as shown in FIG. 1. In operation, the video encoder 100 may receive an input video comprising a sequence of video frames (or slices). Herein, a frame may refer to any of a predicted frame (P-frame), an intra-coded frame (I-frame), or a bi-predictive frame (B-frame). Likewise, a slice may refer to any of a P-slice, an I-slice, or a B-slice.

The RDO module 110 may be configured to coordinate or make logic decisions for one or more of other modules. For example, based on one or more previously encoded frames, the RDO module 110 may determine how a current frame (or slice) being encoded is partitioned into a plurality of coding units (CUs), and how a CU is partitioned into one or more prediction units (PUs) and transform units (TUs). CU, PU, and TU are various types of blocks used in HEVC. In addition, the RDO module 110 may determine how the current frame is to be predicted. The current frame may be predicted via inter and/or intra prediction. For intra prediction, there are a plurality of available prediction modes or directions in HEVC (e.g., 34 modes for the Y component and six modes (including LM mode) for the U or V component), and an optimal mode may be determined by the RDO module 110. For example, the RDO module 110 may calculate a sum of absolute error (SAE) for each prediction mode, and select a prediction mode that results in the smallest SAE.

The prediction module 120 may utilize either reference frames for inter prediction or reference pixels in the current frame for intra prediction. In an embodiment, the prediction module 120 is configured to use a disclosed LM mode to generate a prediction block for a current chroma block from the input video. The prediction block comprises a plurality of predicted chroma samples, each of which may be generated based on a first plurality of reconstructed luma samples located in a corresponding reconstructed luma block, a second plurality of reconstructed luma samples located in neighboring blocks of the corresponding reconstructed luma block, and a plurality of reconstructed chroma samples located in neighboring blocks of the chroma block. In an embodiment, generating the plurality of predicted chroma samples includes computing the intermediate variable a2s using e.g., equation (17) described earlier, which is based on the second plurality of reconstructed luma samples. Generating the plurality of predicted chroma samples further includes deriving the intermediate variable lmDiv from a2s using a look-up table. In an embodiment, the look-up table may comprise less than 63 a2s values.

Upon generation of the prediction block for the current chroma block, the current chroma block may be subtracted by the prediction block, or vice versa, to generate a residual block. The residual block may be fed into the transform module 130, which may convert residual chroma samples into a matrix of transform coefficients via a two-dimensional orthogonal transform, such as a discrete cosine transform (DCT). Then, the matrix of transform coefficients may be quantized by the quantization module 140 before being fed into the entropy encoder 150. The quantization module 140 may alter the scale of the transform coefficients and round them to integers, which may reduce the number of non-zero transform coefficients. As a result, a compression ratio may be increased. Quantized transform coefficients may be scanned and encoded by the entropy encoder 150 into an encoded bitstream. Further, to facilitate continuous encoding of chroma blocks, the quantized transform coefficients may also be fed into the de-quantization module 160 to recover the original scale of the transform coefficients. Then, the inverse transform module 170 may perform the inverse of the transform module 130 and generate a noisy version of the original residual block. Then, the lossy residual block may be fed into the reconstruction module 180, which may generate reconstructed luma and/or chroma samples for intra prediction of future chroma blocks. If desired, filtering may be performed on the reconstructed samples before they are used for intra prediction.

It should be noted that FIG. 1 may be a simplified illustration of a video encoder, thus it may include only part of modules present in the video encoder. Other modules (e.g., filter, scanner, and transmitter), although not shown in FIG. 1, may also be included to facilitate video encoding as understood by one of skill in the art. In addition, depending on the encoding scheme, some of the modules in the video encoder may be skipped. For example, in lossless encoding of certain video content, no information loss may be allowed, thus the quantization module 140 and the de-quantization module 160 may be skipped. For another example, if the residual block is encoded directly without being converted to transform coefficients, the transform module 130 and the inverse transform module 170 may be skipped. Moreover, prior to transmission from the encoder, the encoded bitstream may be configured to include other information, such as video resolution, frame rate, block partitioning information (sizes, coordinates), prediction modes, etc., so that the encoded sequence of video frames may be properly decoded by a video decoder.

Figure 2:
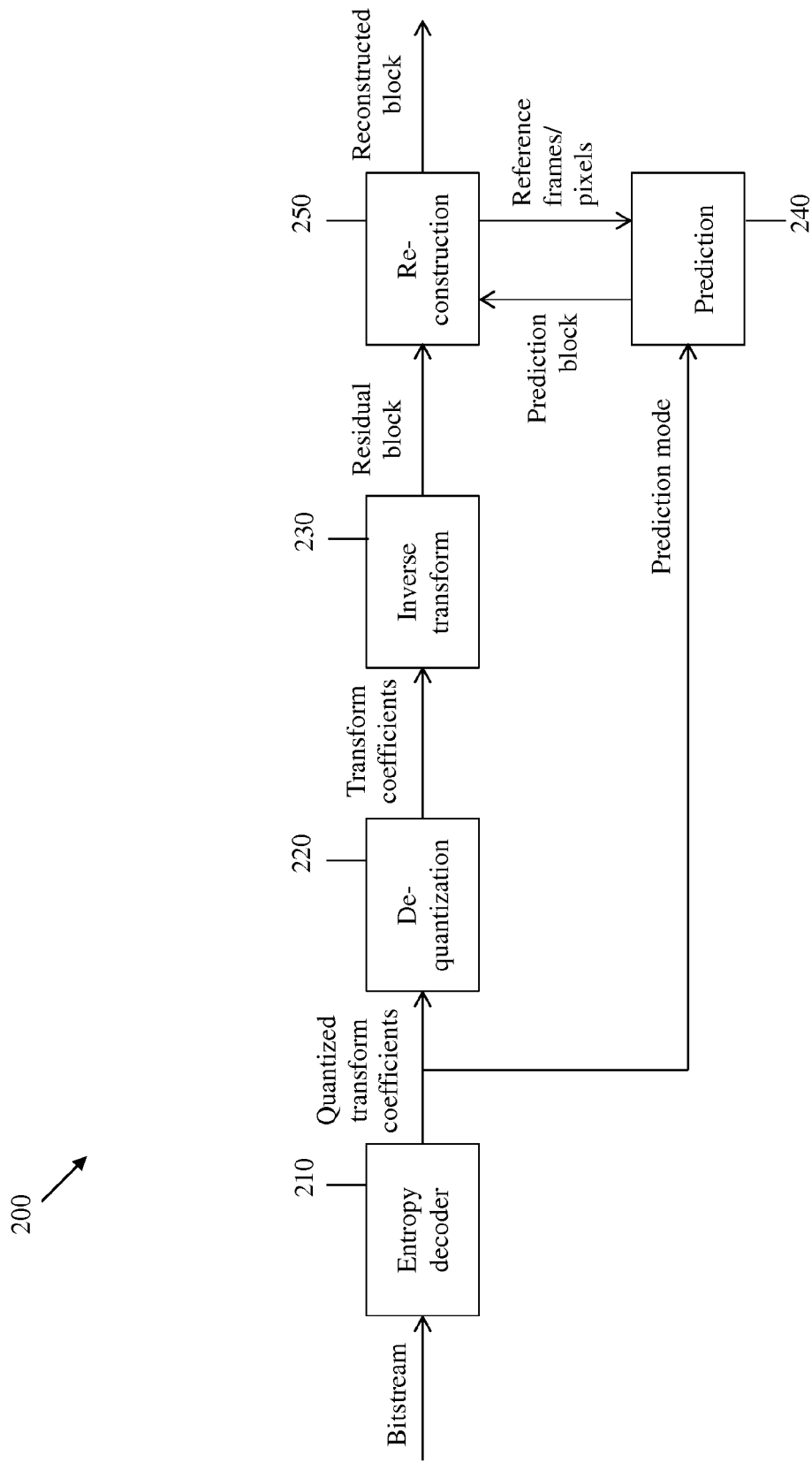
FIG. 2 is a schematic diagram of an embodiment of a video decoder.

FIG. 2 illustrates an embodiment of a video decoder 200, in which a disclosed LM mode may be used. The video decoder 200 may correspond to the video encoder 100, and may comprise an entropy decoder 210, a de-quantization module 220, an inverse transform module 230, a prediction module 240, and a reconstruction module 250 arranged as shown in FIG. 2. In operation, an encoded bitstream containing information of a sequence of video frames may be received by the entropy decoder 210, which may decode the bitstream to an uncompressed format. A matrix of quantized transform coefficients may be generated, which may then be fed into the de-quantization module 220, which may be the same or similar to the de-quantization module 160 in FIG. 1. Then, output of the de-quantization module 220 may be fed into the inverse transform module 230, which may convert transform coefficients to residual values of a residual block. In addition, information containing a prediction mode (e.g., the LM mode) of the current block may also be decoded by the entropy decoder 210. Based on the prediction mode, the prediction module 240 may generate a prediction block for the current block.

In an embodiment, the prediction module 240 is configured to use a disclosed LM mode to generate a prediction block for a current chroma block. The prediction block comprises a plurality of predicted chroma samples, each of which may be generated based on a first plurality of reconstructed luma samples located in a corresponding reconstructed luma block (already decoded), a second plurality of reconstructed luma samples located in neighboring blocks (already decoded) of the corresponding reconstructed luma block, and a plurality of reconstructed chroma samples located in neighboring blocks (already decoded) of the chroma block. In an embodiment, generating the plurality of predicted chroma samples includes computing the intermediate variable a2s, which is based on the second plurality of reconstructed luma samples. Generating the plurality of predicted chroma samples further includes deriving the intermediate variable lmDiv from a2s using a look-up table. In an embodiment, the look-up table may comprise less than 63 a2s values.

Upon generation of the prediction block for the current chroma block, the reconstruction module 250 may combine the residual chroma block with the prediction block to generate a reconstructed chroma block. Additionally, to facilitate continuous decoding, some chroma samples of the reconstructed chroma block may also serve as reference pixels for intra prediction of future chroma blocks in the same frame.

In a video codec (e.g., the video encoder 100 or decoder 200), to simplify the LM mode used in intra prediction, another intermediate variable, denoted as avgY', is introduced herein to represent an average value of the filtered neighboring luma samples. In an embodiment, variable avgY' is defined as:

$$\text{avg}Y' = \frac{\sum_{y=0}^{nS-1} p'_Y[-1, y] + \sum_{x=0}^{nS-1} p'_Y[x, -1]}{2*nS} \quad (24)$$

Based on avgY', differences between each filtered neighboring luma sample and the average value may be computed using following equations, wherein $\Delta p_Y'[-1, y]$ denotes a difference between a luma sample in position $[-1, y]$ and the average of the top neighboring row, and wherein $\Delta p_Y'[x, -1]$ denotes a difference between a luma sample in position $[x, -1]$ and the average of the left neighboring column.

$$\Delta p_Y'[-1,y] = p_Y'[-1,y] - \text{avg}Y' \quad (25)$$

$$\Delta p_Y'[x,-1] = p_Y'[x,-1] - \text{avg}Y' \quad (26)$$

Based on aforementioned equations, following derivation can be conducted:

$$a2 = (LL << k2) - L*L \quad (27)$$

$$= \frac{\left(\sum_{y=0}^{nS-1} p'_Y[-1, y]^2 + \sum_{x=0}^{nS-1} p'_Y[x, -1]^2\right)*2^{k2}}{2^{k3}} - \frac{\left(\sum_{y=0}^{nS-1} p'_Y[-1, y] + \sum_{x=0}^{nS-1} p'_Y[x, -1]\right)^2}{2^{2*k3}}$$

$$= \frac{\left(\sum_{y=0}^{nS-1} p'_Y[-1, y]^2 + \sum_{x=0}^{nS-1} p'_Y[x, -1]^2\right)*2^{k2+k3} - \left(\sum_{y=0}^{nS-1} p'_Y[-1, y] + \sum_{x=0}^{nS-1} p'_Y[x, -1]\right)^2}{2^{2*k3}}$$

$$= \frac{2*nS*\left(\sum_{y=0}^{nS-1} p'_Y[-1, y]^2 + \sum_{x=0}^{nS-1} p'_Y[x, -1]^2\right) - \left(\sum_{y=0}^{nS-1} p'_Y[-1, y] + \sum_{x=0}^{nS-1} p'_Y[x, -1]\right)^2}{2^{2*k3}}$$

$$= \frac{2*nS*\left(\sum_{y=0}^{nS-1} (\text{avg}Y' + \Delta p'_Y[-1, y])^2 + \sum_{x=0}^{nS-1} (\text{avg}Y' + \Delta p'_Y[x, -1])^2\right) - (2*nS*\text{avg}Y')^2}{2^{2*k3}}$$

$$= \frac{2*nS*\left(2*nS*\text{avg}Y'^2 + \left(\sum_{y=0}^{nS-1} \Delta p'_Y[-1, y]^2 + \sum_{x=0}^{nS-1} \Delta p'_Y[x, -1]^2\right) + 2*\text{avg}Y'*\left(\sum_{y=0}^{nS-1} \Delta p'_Y[-1, y] + \sum_{x=0}^{nS-1} \Delta p'_Y[x, -1]\right)\right) - (2*nS*\text{avg}Y')^2}{2^{2*k3}}$$

$$= \frac{2*nS*\left(\sum_{y=0}^{nS-1} \Delta p'_Y[-1, y]^2 + \sum_{x=0}^{nS-1} \Delta p'_Y[x, -1]^2\right)}{2^{2*k3}}$$

$$\geq \frac{8*\left(\sum_{y=0}^{nS-1} \Delta p'_Y[-1, y]^2 + \sum_{x=0}^{nS-1} \Delta p'_Y[x, -1]^2\right)}{2^{2*k3}} \quad (\text{when } nS \geq 4)$$

Depending on pre-configured parameters used in video coding, the variable a2 may be greater than or equal to a certain value. For example, in HEVC, the size of a chroma block (indicated by nS) may reside in the range of 4 to 32 (i.e., 4 nS<32). Further, a luma bit depth may be 8 or 10.

In equation (27), if the luma bit depth is 8 and $4 \leq nS \leq 32$, $p_Y'[x, -1]$ and $p_Y'[-1, y]$ have a maximum of 8 bits. In this case, using equation (7) it can be derived that k3=0. Alternatively, if the luma bit depth is 10 and $4 \leq nS \leq 16$, it can also be derived that k3=0. Accordingly, when k3=0, equation (27) can be re-written as:

$$a2 \geq 8*\left(\sum_{y=0}^{nS-1} \Delta p'_Y[-1, y]^2 + \sum_{x=0}^{nS-1} \Delta p'_Y[x, -1]^2\right) \quad (28)$$

From equation (28), it can be seen that if any two luma samples are not equal (i.e., at least one $\Delta p_Y' \neq 0$), a2 is always equal to or greater than 8. Since a number of the neighboring luma samples may be large (e.g., 65 for a 32×32 chroma block), it may be common to have at least two unequal luma samples. From equation (17), it can be seen that if a2 is equal to or greater than 8, a2s then equals a2. In other words, a2s is also always equal to or greater than 8. Because a2s is the index of the lmDiv look-up table, the number of entries can therefore be reduced by 7 (e.g., from 63 to 56). In an embodiment, Table 2 is used to look up lmDiv values.

TABLE 2

Specification of lmDiv look-up table.

| a2s | 8 | 9 | 10 | 11 | 12 | 13 | 14 | 15 | 16 |
|---|---|---|---|---|---|---|---|---|---|
| lmDiv | 4096 | 3641 | 3277 | 2979 | 2731 | 2521 | 2341 | 2185 | 2048 |
| a2s | 17 | 18 | 19 | 20 | 21 | 22 | 23 | 24 | 25 |
| lmDiv | 1928 | 1820 | 1725 | 1638 | 1560 | 1489 | 1425 | 1365 | 1311 |
| a2s | 26 | 27 | 28 | 29 | 30 | 31 | 32 | 33 | 34 |
| lmDiv | 1260 | 1214 | 1170 | 1130 | 1092 | 1057 | 1024 | 993 | 964 |
| a2s | 35 | 36 | 37 | 38 | 39 | 40 | 41 | 42 | 43 |
| lmDiv | 936 | 910 | 886 | 862 | 840 | 819 | 799 | 780 | 762 |
| a2s | 44 | 45 | 46 | 47 | 48 | 49 | 50 | 51 | 52 |
| lmDiv | 745 | 728 | 712 | 697 | 683 | 669 | 655 | 643 | 630 |
| a2s | 53 | 54 | 55 | 56 | 57 | 58 | 59 | 60 | 61 |
| lmDiv | 618 | 607 | 596 | 585 | 575 | 565 | 555 | 546 | 537 |
| a2s | 62 | 63 | | | | | | | |
| lmDiv | 529 | 520 | | | | | | | |

Compared with the original lmDiv look-up table (Table 1) which contains 63 lmDiv entries, the disclosed Table 2 comprises only 56 entries. The reduction in the number of entries may lead to saving of storage space in a codec. Values of lmDiv in Table 2 is calculated based on pseudo code as follows, wherein i=a2s:

UInt lmDiv [56];
for(Int i=8; i<64; i++)

$$\text{lmDiv}[i] = ((1<<15) + i/2)/i \quad (29)$$

Note that equation (29) is the similar to equation (23), except that a starting value of variable i is changed from 1 to 8. If the value of i or a2s is known, only one computation is needed to determine lmDiv instead of going through a loop of 56 iterative computations.

In an alternative embodiment, instead of using equation (29), the lmDiv [i] may be derived from i as follows, wherein i=a2s:

$$\text{lmDiv}[i] = (1 << (\text{BitDepth}C + 4) + i/2)/i.$$

In practice, either Table 2 or equation (29) may be used to determine a value of lmDiv. In an embodiment, Table 2 is used, in which case equation (30) may replace equation (18), while keeping other equations intact. The use of equation (30) may simplify the computation process of the LM mode, since a threshold of comparison for a2s is raised from 1 to 8. Consequently, for a2s in the range of 1 to 7, a3 is deemed to be 0, without being further computed based on a1s and lmDiv. a3 may thus be computed as:

$$a3=a2s<8?0:Clip3(-2^{15},2^{15}-1,a1s*lmDiv\,[a2s]+ (1<<(k1-1))>>k1) \quad (30)$$

In an embodiment, the operation to get the multiplication part (i.e., a1s*lmDiv [a2s]) in equation (30) can also be described using following code:

```
int g;
if (a2s >= 8)
    g= a1s * lmDiv [ a2s ];
else
    g = 0;
```

Returning to equation (28), it can be seen that if a difference between any luma pixel and the average value is greater than one (i.e., at least one $\Delta p_Y' \geq 2$), or if at least four differences between any four luma pixels and the average value is greater than zero (i.e., at least four $\Delta p_Y' \neq 0$), then a2 is always equal to or greater than 32. Since the number of neighboring luma pixels may be large (e.g., 65 for a 32×32 chroma block), this scenario may occur regularly. From equation (17), it can be seen that if a2 is equal to or greater than 32, a2s then equals a2. In other words, a2s is also always equal to or greater than 32. Because a2s is the index of the lmDiv look-up table, the number of entries of can therefore be reduced by 31 (e.g., from 63 to 32). In an embodiment, Table 3 is used to look up lmDiv values.

TABLE 3

Specification of lmDiv look-up table.

| a2s | 32 | 33 | 34 | 35 | 36 | 37 | 38 | 39 | 40 | 41 | 42 | 43 | 44 |
|---|---|---|---|---|---|---|---|---|---|---|---|---|---|
| lmDiv | 1024 | 993 | 964 | 936 | 910 | 886 | 862 | 840 | 819 | 799 | 780 | 762 | 745 |
| a2s | 45 | 46 | 47 | 48 | 49 | 50 | 51 | 52 | 53 | 54 | 55 | 56 | 57 |
| lmDiv | 728 | 712 | 697 | 683 | 669 | 655 | 643 | 630 | 618 | 607 | 596 | 585 | 575 |
| a2s | 58 | 59 | 60 | 61 | 62 | 63 | | | | | | | |
| lmDiv | 565 | 555 | 546 | 537 | 529 | 520 | | | | | | | |

Compared with the original lmDiv look-up table (Table 1) which contains 63 lmDiv entries, the disclosed Table 3 comprises only 32 entries. The reduction in the number of entries may lead to saving of storage space in a codec. Values of lmDiv in Table 3 is calculated based on the code as follows, wherein i=a2s:
UInt lmDiv [32];
for(Int i=32; i<64; i++)

$$lmDiv\,[i]=((1<<15)+i/2)/i \quad (31)$$

Note that equation (31) is the similar to equation (23), except that a starting value of variable i is changed from 1 to 32. If the value of i or a2s is known, only one computation is needed to determine lmDiv instead of going through a loop of 32 iterative computations.

In practice, either Table 3 or equation (31) may be used to determine a value of lmDiv, which is a function of a2s. In an embodiment, Table 3 is used, in which case equation (32) may replace equation (18), while keeping other equations intact. The use of equation (31) may simplify the computation process of the LM mode, since a threshold of comparison for a2s is raised from 1 to 32. Consequently, for a2s in the range of 1 to 31, a3 is deemed to be 0, without being further computed based on a1s and lmDiv. a3 may thus be computed as:

$$a3=a2s<32?0:Clip3(-2^{15},2^{15}-1,a1s*lmDiv\,[a2s]+ (1<<(k1-1))>>k1) \quad (32)$$

In an embodiment, the operation to get the multiplication part (i.e., a1s*lmDiv [a2s]) in equation (32) can also be described using following code:

```
int h;
if (a2s >= 32)
    h= a1s * lmDiv [ a2s ];
else
    h = 0;
```

In an embodiment, predicted chroma samples may be generated using filtered luma samples and reconstructed chroma samples via following equations and/or pseudo code, wherein the lmDiv value is looked up from a 32-entry look-up table:

$$k3 = \text{Max}(0, BitDepth_C + \log_2(nS) - 14) \quad (32)$$

$$p_Y'[x, -1] = (recSamples_L[2x-1, -1] + 2*recSamples_L[2x, -1] + recSamples_L[2x+1, -1] + 2) >> 2,$$

with $x = 0 \ldots nS - 1$ $$p_Y'[-1, y] = (recSamples_L[-1, 2y] + recSamples_L[-1, 2y+1]) >> 1,$$

with $y = 0 \ldots nS - 1$ $$p_Y'[x, y] = (recSamples_L[2x, 2y] + recSamples_L[2x, 2y+1]) >> 1,$$

with $x, y = 0 \ldots nS - 1$ $$L = \left(\sum_{y=0}^{nS-1} p_Y'[-1, y] + \sum_{x=0}^{nS-1} p_Y'[x, -1]\right) >> k3$$

$$C = \left(\sum_{y=0}^{nS-1} p[-1, y] + \sum_{x=0}^{nS-1} p[x, -1]\right) >> k3$$

$$LL = \left(\sum_{y=0}^{nS-1} p_Y'[-1, y]^2 + \sum_{x=0}^{nS-1} p_Y'[x, -1]^2\right) >> k3$$

$$LC = \left(\sum_{y=0}^{nS-1} p_Y'[-1, y]*p[-1, y] + \sum_{y=0}^{nS-1} p_Y'[x, -1]*p[x, -1]\right) >> k3$$

$$k2 = \log_2((2*nS) >> k3)$$

$$a1 = (LC << k2) - L*C$$

$$a2 = (LL << k2) - L*L$$

$$k1 = \text{Max}(0, \log_2(\text{abs}(a2)) - 5) - \text{Max}(0, \log_2(\text{abs}(a1)) - 14) + 2$$

$$a1s = a1 >> \text{Max}(0, \log_2(\text{abs}(a1)) - 14)$$

$$a2s = \text{abs}(a2 >> \text{Max}(0, \log_2(\text{abs}(a2)) - 5))$$

$$a3 = a2s < 32?0:Clip3(-2^{15}, 2^{15}-1, a1s*lmDiv[a2s] + (1 << (k1-1)) >> k1)$$

$$alpha = a3 >> \text{Max}(0, \log_2(\text{abs}(a3)) - 6)$$

$$k = 13 - \text{Max}(0, \log_2(\text{abs}(alpha)) - 6)$$

-continued $$\text{beta} = (C - ((a*L) >> k) + (1 << (k2 - 1))) >> k2$$

$$predSamples[x, y] = \text{Clip1}_C(((p'_Y[x, y] * \text{alpha}) >> k) + \text{beta}),$$

with $x, y = 0 \ldots nS - 1$

It should be noted that the equations, code, and/or pseudo code described herein may be implemented using any suitable coding or programming language, such as C/C++, Java, Perl, Python, Matlab, verilog, very-high-speed integrated circuits hardware description language (VHDL), any other language, or any combination thereof. Further, intermediate variables used herein may or may not have a corresponding physical quantity. Notations of variables can be changed without departing principles of the present disclosure. In implementation, if a second variable does not depend on a first variable, then the second variable may be computed before or after the first variable. Otherwise, if the second variable depends on the first variable, then the second variable is computed after the first variable. Moreover, there may be various approaches to generate prediction chroma samples, which may use same or different intermediate variables and algorithms. For example, part of the pseudo code may be changed to use equation (31) in determining an lmDiv value instead of using a look-up table (e.g., Table 3). In an embodiment, equation (32) in the pseudo code above may be replaced by equations (33) and (34) below, while leaving the other parts of the pseudo code intact:

$$\text{lmDiv} = (1 << 15 + a2s/2)/a2s \quad (33)$$

$$a3 = a2s < 32 ? 0 : \text{Clip3}(-2^{15}, 2^{15}-1, a1s*\text{lmDiv} + (1 << (k1-1))) >> k1) \quad (34)$$

While a YUV sampling rate of 4:2:0, as described above, may require filtering of reconstructed luma samples before using them as reference samples, other sampling rates may require no filtering or subsampling, or may have different filtering schemes. For example, in 4:4:4 sampling, each reconstructed luma sample may be used directly as reference samples, without any further filtering or downsampling. In this case, a current chroma block and its corresponding luma block have a same size of nS×nS (or 2nS×2nS if desired). Further, $p_Y'[x, y] = recSamples_L[x, y]$ with $x, y = -1 \ldots nS-1$. Alternatively, since no filtering is needed anymore, notation $p_Y'[x, y]$ may simply be skipped, and $recSamples_L[x, y]$ is used instead in later computations.

In an embodiment of LM mode with 4:4:4 coded blocks, predicted chroma samples may be generated using reconstructed luma and chroma samples via the following equations and/or pseudo code, wherein the lmDiv value is looked up from a 32-entry look-up table:

$$k3 = \text{Max}(0, BitDepth_C + \log_2(nS) - 14)$$

$$L = \left(\sum_{y=0}^{nS-1} recSamples_L[-1, y] + \sum_{x=0}^{nS-1} recSamples_L[x, -1]\right) >> k3$$

$$C = \left(\sum_{y=0}^{nS-1} p[-1, y] + \sum_{x=0}^{nS-1} p[x, -1]\right) >> k3$$

$$LL = \left(\sum_{y=0}^{nS-1} recSamples_L[-1, y]^2 + \sum_{x=0}^{nS-1} recSamples_L[x, -1]^2\right) >> k3$$

-continued $$LC = \left(\sum_{y=0}^{nS-1} recSamples_L[-1, y] * p[-1, y] + \sum_{y=0}^{nS-1} recSamples_L[x, -1] * p[x, -1]\right) >> k3$$

$$k2 = \log_2((2*nS) >> k3)$$

$$a1 = (LC << k2) - L*C$$

$$a2 = (LL << k2) - L*L$$

$$k1 = \text{Max}(0, \log_2(\text{abs}(a2)) - 5) - \text{Max}(0, \log_2(\text{abs}(a1)) - 14) + 2$$

$$a1s = a1 >> \text{Max}(0, \log_2(\text{abs}(a1)) - 14)$$

$$a2s = \text{abs}(a2 >> \text{Max}(0, \log_2(\text{abs}(a2)) - 5))$$

$$a3 = a2s < 32 ? 0 : \text{Clip3}(-2^{15}, 2^{15} - 1,$$
$$a1s * lmDiv[a2s] + (1 << (k1 - 1)) >> k1)$$

$$\text{alpha} = a3 >> \text{Max}(0, \log_2(\text{abs}(a3)) - 6)$$

$$k = 13 - \text{Max}(0, \log_2(\text{abs}(\text{alpha})) - 6)$$

$$\text{beta} = (C - ((a*L) >> k) + (1 << (k2 - 1))) >> k2$$

$$predSamples[x, y] =$$
$$\text{Clip1}_C(((recSamples_L[x, y] * \text{alpha}) >> k) + \text{beta}),$$

with $x, y = 0 \ldots nS - 1$

It should be noted that, in implementation, part of the equations and/or pseudo code may be changed without departing principles of the present disclosure. For example, in generating a predicted chroma sample, instead of using an lmDiv look-up table, a value of lmDiv may be determined via equations described above.

In use, embodiments of disclosed lmDiv look-up tables can be tested and compared with HEVC test model (HM) anchors. To evaluate coding performance after reducing the number of the lmDiv look-up table from 63 to 56 or 32, simulations were tested using both a 56-entry and a 32-entry lmDiv look-up tables under Intra High Efficiency (HE) configuration. Testing results included the average percentage Bjontegaard Delta (BD) rates on a plurality of resolution classes (Classes A, B, C, D, E, and F) for the three components of color space (Y, U, and V), as well as encryption (Enc) and decryption (Dec) times. In the Class A, only video sequences with an input bit depth of 8 are tested. In the simulations, the BD rates of intra prediction using the disclosed LM mode were compared with the LM mode used in a HM 5.0 anchor, which uses a 63-entry lmDiv look-up table.

Table 4 shows testing results of intra prediction using a 56-entry lmDiv look-up table in comparison to the HM 5.0 anchor. Results suggested that the average BD rates of the test case showed little to no change. For example, the average BD rate of A, B, C, D, and E classes decreased by 0.01% for the U component in All Intra HE and increased by 0.03% for the V component in All Intra HE. Further, in comparison to the HM 5.0 anchor, the encoding (Enc) time of the test case remained the same, and the decoding (Dec) time increased by about 1%.

TABLE 4

Testing result of a 56-entry look-up table vs. HM 5.0 anchor

| | All Intra HE | | |
|---|---|---|---|
| | Y | U | V |
| Class A (8 bit) | 0.01% | −0.03% | 0.01% |
| Class B | 0.00% | −0.01% | 0.02% |
| Class C | 0.00% | −0.03% | −0.01% |
| Class D | 0.00% | 0.01% | 0.00% |
| Class E | 0.00% | 0.02% | 0.01% |
| Overall | 0.00% | −0.01% | 0.00% |
| | 0.00% | −0.01% | 0.00% |
| Class F | 0.00% | −0.01% | 0.03% |
| Enc Time[%] | | 100% | |
| Dec Time[%] | | 101% | |

Table 5 shows testing results of intra prediction using a 32-entry lmDiv look-up table in comparison to the HM 5.0 anchor. Results suggested that the average BD rates of the test case showed little to no change. For example, the average BD rate of A, B, C, D, and E classes decreased by 0.01% for the U and V components in All Intra HE. The decrease in BD rate indicated requirement for a lower bitrate with the same amount of video distortion, which signaled a slightly improved quality of video coding. Further, in comparison to the HM 5.0 anchor, the encoding (Enc) time of the test case remained the same, and the decoding (Dec) time decreased by about 1%.

TABLE 5

Testing result of a 32-entry look-up table vs. HM 5.0 anchor

| | All Intra HE | | |
|---|---|---|---|
| | Y | U | V |
| Class A (8 bit) | 0.01% | −0.03% | −0.03% |
| Class B | 0.00% | 0.00% | 0.01% |
| Class C | 0.00% | −0.01% | 0.00% |
| Class D | −0.01% | 0.01% | −0.04% |
| Class E | 0.00% | −0.01% | −0.01% |
| Overall | 0.00% | −0.01% | −0.01% |
| | 0.00% | −0.01% | −0.01% |
| Class F | −0.01% | −0.01% | 0.00% |
| Enc Time[%] | | 100% | |
| Dec Time[%] | | 99% | |

The simulation results in Tables 4-5 indicated that the reduction of entries in the lmDiv look-up table lead to similar coding performance with the HM 5.0 anchor, while saving storage space.

Figure 3:
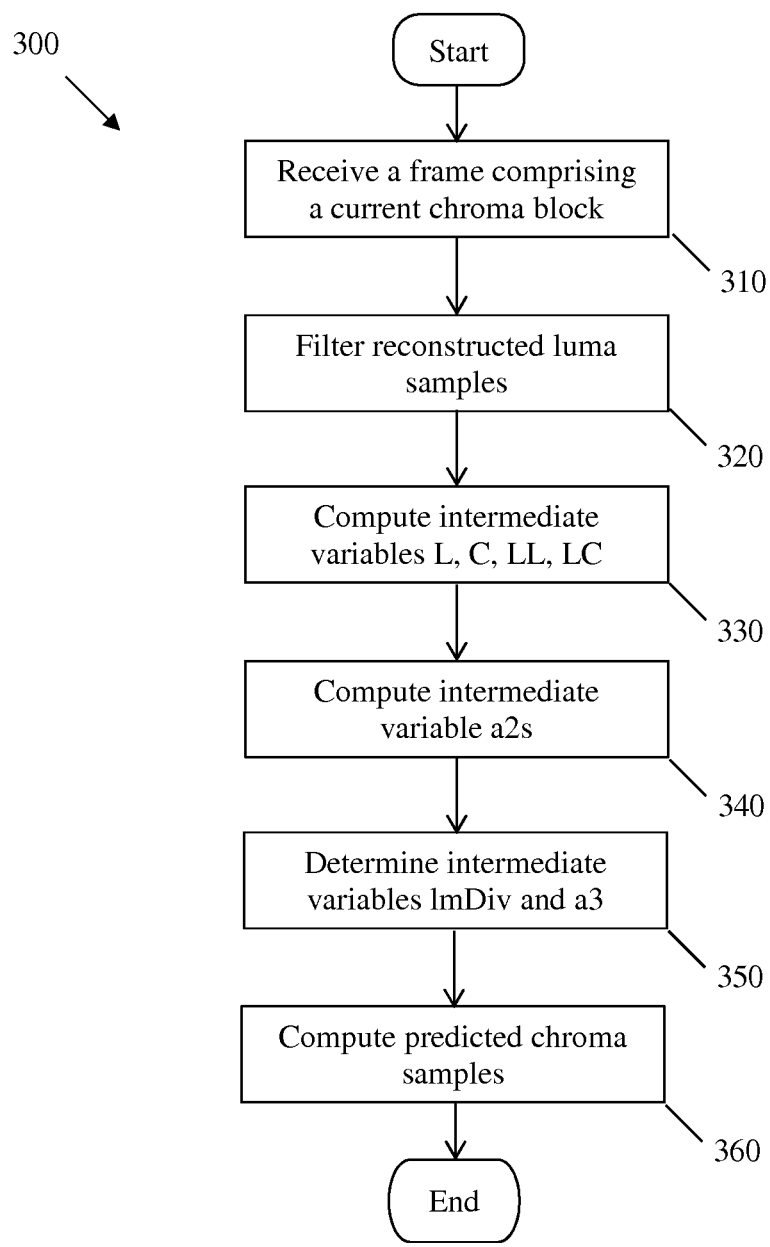
FIG. 3 is a flowchart of an embodiment of an intra prediction method in a disclosed Chroma from Luma linear method (LM) mode.

FIG. 3 is a flowchart of an intra prediction method 300 using a disclosed LM mode. The method 300 may be implemented in a video encoder (e.g., the video encoder 100 in FIG. 1) or a video decoder (e.g., the video decoder 200 in FIG. 2). The method 300 starts in step 310, where a video frame or slice comprising a current chroma block may be received. The video frame may also comprise already-coded blocks including a reconstructed luma block corresponding to the current chroma block, reconstructed luma samples neighboring the corresponding luma block, and reconstructed chroma sample neighboring the current chroma block. The corresponding luma block comprises a plurality of reconstructed luma samples.

Next, in step 320, the reconstructed luma samples may be filtered or downsampled to generate filtered luma samples, which will then be used as reference samples. After filtering, a width of the corresponding reconstructed luma block may be reduced to half, which equals a width of the current chroma block. Filtering or downsampling of the luma component may be needed in, e.g., a sampling rate of 4:2:0. In other sampling rates, such as 4:4:4, reconstructed luma samples may be directly used as reference samples without any filtering or downsampling. In this case, step 320 may be skipped.

Next, in step 330, intermediate variables such as L, C, LL, and LC may be computed based on the filtered luma samples as well as reconstructed chroma samples. The intermediate variables may be computed using equations and/or pseudo code presented herein. Next, in step 340, intermediate variables including a2s may be computed based on previously computed intermediate variables. Then, in step 350, a value of intermediate variable lmDiv may be determined or derived from a2s. Derivation of lmDiv may be based on an lmDiv look-up table, which may comprise 56 or 32 a2s/lmDiv entries. In an embodiment, if a2s is less than 8, lmDiv does not need to be derived. Instead, an additional variable a3 depending on lmDiv may be deemed to equal 0. In another embodiment, a3 is deemed to be zero if a2s is less than 32.

Next, in step 360, predicted chroma samples may be computed based on previously determined intermediate variables. The predicted chroma samples make up the prediction block of the current chroma block. It should be understood that the method 300 may include only a portion of intermediate variables needed to complete the LM mode, thus other intermediate variables, such as k, k1, k2, k3, alpha, beta, etc., may be incorporated into the intra prediction process wherever appropriate. Notations of intermediate variables may be changed without departing principles of the disclosed LM mode.

Figure 4:
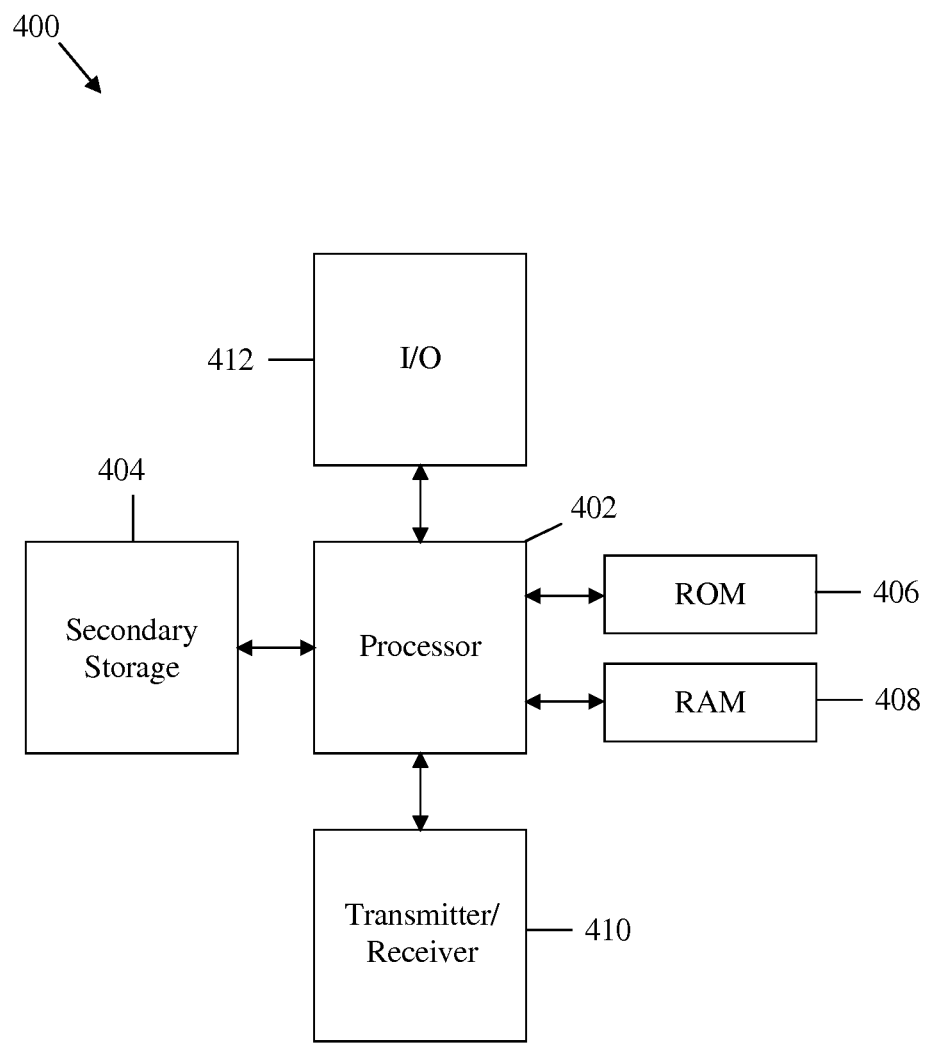
FIG. 4 is a schematic diagram of a general purpose computer system.

The schemes described above may be implemented on any general-purpose computer system, such as a computer or network component with sufficient processing power, memory resources, and network throughput capability to handle the necessary workload placed upon it. FIG. 4 illustrates a schematic diagram of a general-purpose computer system 400 suitable for implementing one or more embodiments of the methods disclosed herein, such as the video encoder 100, the video decoder 200, and the intra prediction method 300. The computer system 400 includes a processor 402 (which may be referred to as a central processor unit or CPU) that is in communication with memory devices including secondary storage 404, read only memory (ROM) 406, random access memory (RAM) 408, transmitter/receiver 410, and input/output (I/O) device 412. Although illustrated as a single processor, the processor 402 is not so limited and may comprise multiple processors. The processor 402 may be implemented as one or more CPU chips, cores (e.g., a multi-core processor), field-programmable gate arrays (FPGAs), application specific integrated circuits (ASICs), and/or digital signal processors (DSPs), and/or may be part of one or more ASICs. The processor 402 may be configured to implement any of the schemes, including implementation of pseudo code, described herein, such as the video encoder 100, the video decoder 200, and the intra prediction method 300. The processor 402 may be implemented using hardware, software, or both.

The secondary storage 404 is typically comprised of one or more disk drives or tape drives and is used for non-volatile storage of data and as an over-flow data storage device if the RAM 408 is not large enough to hold all working data. The secondary storage 404 may be used to store programs that are loaded into the RAM 408 when such programs are selected for execution. The ROM 406 is used to store instructions and perhaps data that are read during program execution. The ROM 406 is a non-volatile memory device that typically has a small memory capacity relative to the larger memory capacity of the secondary storage 404. The RAM 408 is used to store volatile data and perhaps to store instructions. Access to both the ROM 406 and the RAM 408 is typically faster than to the secondary storage 404.

The transmitter/receiver 410 may serve as an output and/or input device of the video codec 400. For example, if the transmitter/receiver 410 is acting as a transmitter, it may transmit data out of the computer system 400. If the transmitter/receiver 410 is acting as a receiver, it may receive data into the computer system 400. The transmitter/receiver 410 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 1092 may enable the processor 1082 to communicate with an Internet or one or more intranets. I/O devices 412 may include a video monitor, liquid crystal display (LCD), touch screen display, or other type of video display for displaying video, and may also include a video recording device for capturing video. I/O devices 412 may also include one or more keyboards, mice, or track balls, or other well-known input devices.

It is understood that by programming and/or loading executable instructions onto the computer system 400, at least one of the processor 402, the RAM 408, and the ROM 406 are changed, transforming the computer system 400 in part into a particular machine or apparatus, e.g., a video codec, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 70 percent, 71 percent, 72 percent, . . . , 95 percent, 96 percent, 97 percent, 98 percent, 99 percent, or 100 percent. Moreover, any numerical range defined by two R numbers as defined in the above is also specifically disclosed. The use of the term about means ±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A video codec comprising:
   a processor configured to:
   generate a prediction block for a chroma block, wherein the prediction block comprises a predicted chroma sample, wherein the predicted chroma sample is based on:
   a first reconstructed luma sample located in a corresponding reconstructed luma block;
   a second reconstructed luma sample located in a neighboring block of the corresponding reconstructed luma block; and
   a look-up table, wherein a value of an index of the look-up table is based on the second reconstructed luma sample, wherein a number of indices of the look-up table is either 32 or 56;
   obtain the chroma block;
   generate a residual block indicating a difference between the chroma block and the prediction block; and
   entropy encode the residual block into an encoded video bitstream, wherein a transmitter is coupled to the processor and configured to transmit the encoded video bitstream.

2. The video codec of claim 1, wherein the value of the index of the look-up table, denoted as a2s, determines a value of an intermediate variable, denoted as lmDiv, in the look-up table, and wherein the number of indices of the look-up table is 56 which includes 56 a2s entries with values from 8-63.

3. The video codec of claim 2, wherein when the number of indices of the look-up table is 56 which includes 56 a2s entries with values from 8-63 and when the value of the a2s is below 8, the lmDiv is 0.

4. The video codec of claim 1, wherein each value of the index of the look-up table, denoted as a2s, determines a value of an intermediate variable denoted as lmDiv in the look-up table, and wherein the number of indices of the look-up table is 32 which includes 32 a2s entries with values from 32-63.

5. The video codec of claim 4, wherein when the number of indices of the look-up table is 32 which includes 32 a2s entries with values from 32-63 and when the value of the a2s is below 32, the lmDiv is 0.

6. The video codec of claim 4, wherein the look-up table is:

| a2s   | 32   | 33  | 34  | 35  | 36  | 37  | 38  | 39  | 40  | 41  | 42  | 43  | 44  |
|-------|------|-----|-----|-----|-----|-----|-----|-----|-----|-----|-----|-----|-----|
| lmDiv | 1024 | 993 | 964 | 936 | 910 | 886 | 862 | 840 | 819 | 799 | 780 | 762 | 745 |
| a2s   | 45   | 46  | 47  | 48  | 49  | 50  | 51  | 52  | 53  | 54  | 55  | 56  | 57  |
| lmDiv | 728  | 712 | 697 | 683 | 669 | 655 | 643 | 630 | 618 | 607 | 596 | 585 | 575 |
| a2s   | 58   | 59  | 60  | 61  | 62  | 63  |     |     |     |     |     |     |     |
| lmDiv | 565  | 555 | 546 | 537 | 529 | 520. |    |     |     |     |     |     |     |

7. The video codec of claim 2, wherein a width of the chroma block is half of a width of the corresponding reconstructed luma block.

8. The video codec of claim 1, wherein generating the predicted chroma sample comprises:
   filtering a first plurality of reconstructed luma samples to generate a first filtered luma sample; and
   filtering a second plurality of reconstructed luma samples to generate a second filtered luma sample.

9. The video codec of claim 4, Wherein generating the predicted chroma sample further comprises computing an intermediate variable, denoted as a3, according to the following equation:

$$a3 = a2s < 32\,?\,0 : \text{Clip3}(-2^{15}, 2^{15}-1, a1s * \text{lmDiv}[a2s] + (1 << (k1-1))) >> k1),$$

wherein a1s and k1 denote other intermediate variables whose values depend on the second reconstructed luma sample and a reconstructed chroma sample located in a neighbouring block of the chroma block.

10. The video codec of claim 9, wherein C, L, a, k, k2, alpha, and beta denote other intermediate variables whose values depend on at least one of the second reconstructed luma sample and the reconstructed chroma sample, wherein a filtered luma sample generated based on the first reconstructed luma sample is denoted as p'[x, y], wherein the predicted chroma sample is denoted as predSamples[x, y], wherein generating the predicted chroma sample further comprises the following equations:

$$\text{alpha} = a3 >> \text{Max}(0, \log_2(abs(a3))-6);$$

$$k = 13 - \text{Max}\,0, \log_2(abs(\text{alpha}))-6);$$

$$\text{beta} = (C - ((a*L) >> k) + (1 << (k2-1))) >> k2;\ \text{and}$$

$$\text{predSamples}[x,y] = \text{Clip1}_C(((p_Y'[x,y]*\text{alpha}) >> k) + \text{beta}),\ \text{with}\ x,y = 0 \ldots nS-1,$$

wherein function $\text{Clip1}_C(x)$ is defined as:

$$\text{Clip1}_C(x) = \text{Clip3}(0, (1 << \text{BitDepth}_C) - 1, x),$$

and wherein $\text{BitDepth}_C$ denotes an input bit depth of the chroma block.

11. The video codec of claim 10, wherein the input bit depth equals 8 or 10.

12. The video codec of claim 9, wherein a width of the chroma block is no less than 4 and no greater than 16.

13. The video codec of claim 4, wherein a width of the chroma block equals a width of the corresponding reconstructed luma block.

14. The video codec of claim 2, wherein generating the predicted chroma sample further comprises:
   computing an intermediate variable, denoted as a3, according to the following equation:

$$a3 = a2s < 8\,?\,0 : \text{Clip3}(-2^{15}, 2^{15}-1, a1s * \text{lmDiv}[a2s] + (1 << (k1-1))) >> k1),$$

wherein a1s and k1 denote other intermediate variables whose values depend on the second reconstructed luma sample and a reconstructed chroma sample located in a neighbouring block of the chroma block.

15. The video codec of claim 13, wherein the look-up table is:

| a2s   | 8    | 9    | 10   | 11   | 12   | 13   | 14   | 15   | 16   |
|-------|------|------|------|------|------|------|------|------|------|
| lmDiv | 4096 | 3641 | 3277 | 2979 | 2731 | 2521 | 2341 | 2185 | 2048 |
| a2s   | 17   | 18   | 19   | 20   | 21   | 22   | 23   | 24   | 25   |
| lmDiv | 1928 | 1820 | 1725 | 1638 | 1560 | 1489 | 1425 | 1365 | 1311 |
| a2s   | 26   | 27   | 28   | 29   | 30   | 31   | 32   | 33   | 34   |
| lmDiv | 1260 | 1214 | 1170 | 1130 | 1092 | 1057 | 1024 | 993  | 964  |
| a2s   | 35   | 36   | 37   | 38   | 39   | 40   | 41   | 42   | 43   |
| lmDiv | 936  | 910  | 886  | 862  | 840  | 819  | 799  | 780  | 762  |
| a2s   | 44   | 45   | 46   | 47   | 48   | 49   | 50   | 51   | 52   |
| lmDiv | 745  | 728  | 712  | 697  | 683  | 669  | 655  | 643  | 630  |
| a2s   | 53   | 54   | 55   | 56   | 57   | 58   | 59   | 60   | 61   |
| lmDiv | 618  | 607  | 596  | 585  | 575  | 565  | 555  | 546  | 537  |
| a2s   | 62   | 63   |      |      |      |      |      |      |      |
| lmDiv | 529  | 520. |      |      |      |      |      |      |      |

16. A method used in video coding comprising:
   generating, by a processor, a prediction block for a chroma block, wherein the prediction block comprises a predicted chroma sample, wherein the predicted chroma sample is based on:
  a first reconstructed luma sample located in a corresponding reconstructed luma block;
  a second reconstructed luma sample located in a neighboring block of the corresponding reconstructed luma block; and
  a look-up table, wherein a value of an index of the look-up table is based on the second reconstructed luma sample, wherein a number of indices of the look-up table is either 32 or 56;
obtaining, by the processor, the chroma block;
generating a residual block indicating a difference between the chroma block and the prediction block; and
entropy encoding the residual block into an encoded video bitstream, wherein a transmitter is coupled to the processor and configured to transmit the encoded video bitstream.

17. The method of claim 16, wherein each value of the indices of the look-up table, denoted as a2s, determines a value of an intermediate variable denoted as lmDiv in the look-up table, and wherein the number of indices of the look-up table is 56 which includes 56 a2s entries with values from 8-63.

18. The method of claim 17, wherein when the number of indices of the look-up table is 56 which includes 56 a2s entries with values from 8-63 and when the value of the a2s is below 8, the lmDiv is 0.

19. The method of claim 16, wherein each value of the indices of the look-up table, denoted as a2s, determines a value of an intermediate variable denoted as lmDiv in the look-up table, and wherein the number of indices of the look-up table is 32 which includes 32 a2s entries with values from 32-63.

20. The method of claim 19, wherein when the number of indices of the look-up table is 32 Which includes 32 a2s entries with values from 32-63 and when the value of the a2s is below 32, the lmDiv is 0.

21. The method of claim 19, wherein the look-up table is:

| a2s | 32 | 33 | 34 | 35 | 36 | 37 | 38 | 39 | 40 | 41 | 42 | 43 | 44 |
|---|---|---|---|---|---|---|---|---|---|---|---|---|---|
| lmDiv | 1024 | 993 | 964 | 936 | 910 | 886 | 862 | 840 | 819 | 799 | 780 | 762 | 745 |
| a2s | 45 | 46 | 47 | 48 | 49 | 50 | 51 | 52 | 53 | 54 | 55 | 56 | 57 |
| lmDiv | 728 | 712 | 697 | 683 | 669 | 655 | 643 | 630 | 618 | 607 | 596 | 585 | 575 |
| a2s | 58 | 59 | 60 | 61 | 62 | 63 | 64 | | | | | | |
| lmDiv | 565 | 555 | 546 | 537 | 529 | 520 | 512. | | | | | | |

22. The method of claim 19, wherein generating the predicted chroma sample comprises:
computing an intermediate variable, denoted as a3, according to the following equation:

$$a3 = a2s < 32\;?\;0 : \text{Clip3}(-2^{15}, 2^{15}-1, a1s * \text{lmDiv}[a2s] + (1 << (k1-1)) >> k1),$$

wherein a1s and k1 denote other intermediate variables whose values depend on the second reconstructed luma sample and a reconstructed chroma sample located in a neighbouring block of the chroma block.

23. The method of claim 19, wherein a width of the chroma block is half of a width of the corresponding reconstructed luma block.

24. A video codec comprising:
a processor configured to:
  obtain an encoded residual block from an encoded video bitstream, wherein a receiver is coupled to the processor and configured to receive the encoded video bitstream;
  generate a prediction block for a chroma block, wherein the prediction block comprises a predicted chroma sample, wherein the predicted chroma sample is based on:
    a first reconstructed luma sample located in a corresponding reconstructed luma block;
    a second reconstructed luma sample located in a neighboring block of the corresponding reconstructed luma block; and
    a look-up table, wherein a value of an index of the look-up table is based on the second reconstructed luma sample, wherein a number of indices of the look-up table is either 32 or 56;
  decode the encoded residual block to generate a decoded residual block; and
  combine the decoded residual block and the prediction block to generate the chroma block.

25. The video codec of claim 24, wherein the value of the index of the look-up table, denoted as a2s, determines a value of an intermediate variable, denoted as lmDiv, in the look-up table, and wherein the number of indices of the look-up table is 56 which includes 56 a2s entries with values from 8-63.

26. The video codec of claim 25, wherein when the number of indices of the look-up table is 56 which includes 56 a2s entries with values from 8-63 and when the value of the a2s is below 8, the lmDiv is 0.

27. The video codec of claim 24, wherein each value of the index of the look-up table, denoted as a2s, determines a value of an intermediate variable denoted as lmDiv in the look-up table, and wherein the number of indices of the look-up table is 32 which includes 32 a2s entries with values from 32-63.

28. The video codec of claim 27, wherein when the number of indices of the look-up table is 32 which includes 32 a2s entries with values from 32-63 and when the value of the a2s is below 32, the lmDiv is 0.

29. A method used in video coding comprising:
obtaining, by a processor, an encoded residual block from an encoded video bitstream, wherein a receiver is coupled to the processor and configured to receive the encoded video bitstream;
generating, by the processor, a prediction block for a chroma block, wherein the prediction block comprises a predicted chroma sample, wherein the predicted chroma sample is based on:
  a first reconstructed luma sample located in a corresponding reconstructed luma block;
  a second reconstructed luma sample located in a neighboring block of the corresponding reconstructed luma block; and
  a look-up table, wherein a value of an index of the look-up table is based on the second reconstructed luma sample, wherein a number of indices of the look-up table is either 32 or 56;
decoding, by the processor, the encoded residual block to generate a decoded residual block; and
combining, by the processor, the decoded residual block and the prediction block to generate the chroma block.

30. The method of claim 29, wherein each value of the indices of the look-up table, denoted as a2s, determines a value of an intermediate variable denoted as lmDiv in the look-up table, and wherein the number of indices of the look-up table is 56 which includes 56 a2s entries with values from 8-63.

31. The method of claim 30, Wherein when the number of indices of the look-up table is 56 which includes 56 a2s entries with values from 8-63 and when the value of the a2s is below 8, the lmDiv is 0.

32. The method of claim 29, wherein each value of the indices of the look-up table, denoted as a2s, determines a value of an intermediate variable denoted as lmDiv in the look-up table, and wherein the number of indices of the look-up table is 32 which includes 32 a2s entries with values from 32-63.

33. The method of claim 32, wherein when the number of indices of the look-up table is 32 Which includes 32 a2s entries with values from 32-63 and when the value of the a2s is below 32, the lmDiv is 0.

* * * * *